June 9, 1931.　　　G. W. RIGBY　　　1,808,819
VEHICLE BRAKE
Filed Aug. 9, 1930
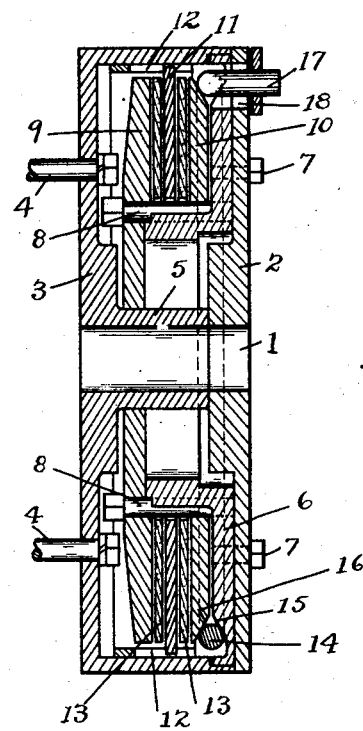
Fig. I.
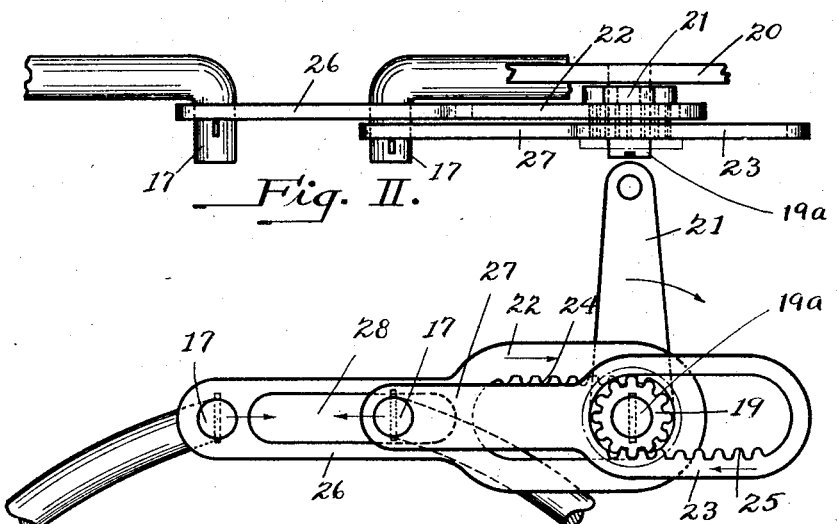
Fig. II.
Fig. III.
INVENTOR
Grant W. Rigby
by Christy Christy & Wharton
his attorneys.

Patented June 9, 1931

1,808,819

UNITED STATES PATENT OFFICE

GRANT W. RIGBY, OF PITTSBURGH, PENNSYLVANIA

VEHICLE BRAKE

Application filed August 9, 1930. Serial No. 474,092.

This invention relates to mechanism for actuating vehicle brakes.

One object of the invention is to provide operating connections which may be used with brakes of the disk type, to act strongly and positively on the ultimate means for moving the braking members proper.

A further object of the invention is to provide brake operating means having such characteristics, which are simple, requiring little space and few parts.

Another object of the invention is to provide a combination of a disk brake with ultimate disk shifting means and operating connections therefor, which gives prompt action in shifting the disks both into and out of braking engagement.

In the accompanying drawings Figure I is a vertical sectional view through a disk brake such as is disclosed in my co-pending application, Serial No. 194,551, filed May 27, 1927, for an improvement in a vehicle brake; Figure II is a plan view of the operating linkage of the brake showing the same connected with the means for acting directly upon the braking members of such brake; and Figure III is a side elevation of the same assembly.

With reference to Figure I of the drawings, the reference numeral 1 designates the axle aperture of the vehicle to which the brake is applied; and the reference numeral 2 a cover plate which may be attached to the axle housing. The brake drum 3, which serves as a closure for the structure, is secured to the vehicle wheel by means of bolts 4, and has a sleeve 5 surrounding the axle aperture 1. A backing plate 6 is secured to the cover plate 2, as by means of bolts 7.

Extending from the backing plate 6 are a plurality of bolts 8, the heads of which bear against the outer surface of a disk member 9. A second disk member 10 is slidable both toward and from disk member 9 on the bolts 8.

Between disks 9 and 10 is a third disk, 11, which is connected with a brake drum 3 to rotate with the vehicle wheel, by suitable means such as a plurality of keys 12. Between the disks 10 and 11 and the disks 11 and 9 are lining disks 13 of asbestos or other suitable brake-lining material.

The means for bringing the disk members into mutual contact comprises a substantially annular rod or broken ring 14, which is of resilient metal, but which is of such cross-sectional area as to possess sufficient stiffness for its purpose. The body of the ring lies between a chamfered seat 15 on the inner face of backing plate 6 and the chamfered edge 16 of the disk 10. At each end of the broken ring 14 is a portion 17 which extends substantially at right angles to the plane embraced by the body of the ring. These extensions 17 project through suitable apertures 18 in the cover plate 2 and backing plate 6. The brake is applied by acting upon the extensions 17 of the broken ring 14, to draw together the ends of the annulus. As the annulus 14 is contracted it moves radially inward along the chamfered seat 15 in the inner face of the backing plate 6 and the chamfered edge 16 of disk member 10, tending to separate these members. As, however, the disk 10 alone of these two members is slidable, it is forced outwardly away from backing plate 6 to shift the slidable disk 11, which is keyed to the drum, until such movement is checked by the disk member 9, and the liners 13 are fully compressed. The slidable disk 11 is thus held against rotation, and rotation of the drum 3 is also thereby prevented.

I may draw the ends 17 of the broken annulus 14 together by special operating means. These means comprise a pinion 19 which is rotatably mounted on a shaft 19a carried by any fixed member 20, and is rotatable by means of a lever arm 21. Surrounding pinion 19 are two yoke members 22 and 23 which lie side by side, and each of which has teeth meshing with the teeth of the pinion. The row of teeth 24 in yoke 22, and the row of teeth 25 in yoke 23, are on opposite sides respectively of the yoke assembly, so that rotation of the pinion tends to move the yoke members in opposite directions. One of the extensions 17 of the broken annulus 14 is rotatably connected with shank 26 of yoke member 22, while the other extension 17 is rotatably connected with shank 27 of yoke member 23, and lies within a slot 28 in shank 26 of yoke member 22.

As rotation of lever 21 and pinion 19 moves the two yokes with which the pinion is in mesh in opposite directions, movement of rotation, as indicated by the arrow in Figure III, causes movement of the yoke members in opposite directions, as indicated by the arrows, and draws together the extensions 17 of the broken annulus 14, thus applying the brake; as may be understood by reference to the description of the brake proper.

It will be clear that by use of the operating mechanism disclosed, a powerful force tending to apply the brakes may be exerted by a relatively slight applied force. It will also be understood that the use of pivoted yokes with internal racks, both meshing with a common pinion, avoids the necessity for providing any guiding means for the operating members, or yokes. That is, they are self-aligning, and may be mounted in any desired position.

I claim as my invention:

1. In a disk brake comprising a drum and a disk arranged to rotate with the drum, the combination of a backing member, a slidable disk, and an incomplete annulus interposed between the disk and backing member and arranged to act on said disk to produce sliding movement thereof.

2. In a disk brake comprising a drum and a disk arranged to rotate with the drum, the combination of a backing member and a slidable disk having co-operating inclined surfaces, a contractile member lying against said inclined surfaces, and means for contracting said member to cause the same to exert a wedging action between the backing member and the slidable disk.

3. In a disk brake comprising a drum and a disk arranged to rotate with the drum, the combination of a backing member and a slidable disk, a contractile member lying between said backing member and said disk, and means for contracting said member to force the same between the backing member and disk to separate the same.

4. A disk brake comprising the combination of a brake drum and a disk arranged to rotate with the drum, a backing member having bolts projecting therefrom, a disk slidable on the bolts, a backing disk on the bolts, lining disks, a contractile member lying between said backing member and said slidable disk, and means for contracting said member to force the disk members into mutual frictional engagement.

5. In a disk brake comprising a drum and a disk arranged to rotate with the drum, the combination of a backing member and a slidable disk, an incomplete annulus lying between said backing member and disk, and mechanical linkage arranged to embrace the ends of said incomplete annulus and to be actuated to decrease the distance therebetween for contracting the annulus and causing it to exert a wedging action between the backing member and the slidable disk.

6. A disk brake comprising a drum and a disk arranged to rotate with the drum, a backing member having bolts projecting therefrom, a disk slidable on the bolts, a backing disk on the bolts, lining disks, an incomplete annulus lying between the backing member and the slidable disk, and a mechanical linkage arranged to embrace the ends of the incomplete annulus and to be actuated to decrease the distance therebetween and thereby cause the annulus to exert a wedging action between the backing member and the slidable disk.

In testimony whereof I have hereunto set my hand.

GRANT W. RIGBY.